(12) United States Patent
Roffe et al.

(10) Patent No.: US 10,527,095 B1
(45) Date of Patent: Jan. 7, 2020

(54) CAGE AND BALL SUB-ASSEMBLY FOR A BALL BEARING

(71) Applicant: Schaeffler Technologies AG & Co. KG, Herzogenaurach (DE)

(72) Inventors: Dennis Roffe, Fort Mill, SC (US); Michael Heaton, Rock Hill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/273,276

(22) Filed: Feb. 12, 2019

(51) Int. Cl.
*F16C 33/44* (2006.01)
*F16C 33/38* (2006.01)
*F16C 33/41* (2006.01)
*F16C 33/42* (2006.01)

(52) U.S. Cl.
CPC ...... *F16C 33/3831* (2013.01); *F16C 33/3862* (2013.01); *F16C 33/416* (2013.01); *F16C 33/418* (2013.01); *F16C 33/422* (2013.01)

(58) Field of Classification Search
CPC F16C 33/3831; F16C 33/3382; F16C 33/416; F16C 33/418; F16C 33/422; F16C 33/3862
See application file for complete search history.

(56) References Cited

U.S. PATENT DOCUMENTS

| | | | | |
|---|---|---|---|---|
| 3,495,889 | A | * | 2/1970 | Nisbet ................. F16C 33/3831 384/511 |
| 4,572,678 | A | | 2/1986 | Neder et al. |
| 5,131,762 | A | | 7/1992 | Waskiewicz |
| 5,749,661 | A | | 5/1998 | Moller |
| 6,416,230 | B1 | | 7/2002 | Staudigel et al. |
| 8,303,192 | B2 | * | 11/2012 | Yamada ............. F16C 33/3812 384/576 |
| 9,771,980 | B2 | * | 9/2017 | Hayashi ............. F16C 33/4635 |

FOREIGN PATENT DOCUMENTS

DE 102017115881 A1 * 11/2018 ............. F16C 19/06

* cited by examiner

*Primary Examiner* — Thomas R Hannon

(57) ABSTRACT

A cage and ball sub-assembly, including: an axis of rotation; a cylindrical plastic cage including a circumferentially disposed cage surface, a plurality of indentations extending from the circumferentially disposed cage surface into the cylindrical plastic cage in a first radial direction, and a plurality of pockets, each pocket circumferentially disposed between a respective pair of indentations included in the plurality of indentations; a metal insert including a plurality of support tabs, each support tab embedded in the cylindrical plastic cage, and including a circumferentially disposed portion and a flange extending from the circumferentially disposed portion in a second radial direction; and a plurality of balls disposed within the plurality of pockets. A circular arc, centered on the axis of rotation and orthogonal to the axis of rotation, passes through in sequence: a ball; the cylindrical plastic cage; the first flange of a support tab; and the cylindrical plastic cage.

20 Claims, 13 Drawing Sheets

CAGE AND BALL SUB-ASSEMBLY FOR A BALL BEARING

TECHNICAL FIELD

The present disclosure relates to a cage and ball sub-assembly for a ball bearing, in particular a plastic cage with a metal insert at least partially embedded in the cage.

BACKGROUND

Known high speed, plastic ball bearing cages deflect outward at high speeds which causes excessive wear and failure between ball pockets. Known attempts at a solution include solid cages, which are to rigid for high speeds, and indentations that cause other deflection problems at high speeds.

SUMMARY

According to aspects illustrated herein, there is provided a cage and ball sub-assembly, including: an axis of rotation; a cylindrical plastic cage including a first circumferentially disposed cage surface, a first plurality of indentations extending from the first circumferentially disposed cage surface into the cylindrical plastic cage in a first radial direction, and a plurality of pockets, each pocket circumferentially disposed between a respective pair of indentations included in the first plurality of indentations; a metal insert including a plurality of support tabs, each support tab embedded in the cylindrical plastic cage, and including a circumferentially disposed portion and a first flange extending from the circumferentially disposed portion in a second radial direction, opposite the first radial direction; and a plurality of balls disposed within the plurality of pockets. A first circular arc, centered on the axis of rotation and orthogonal to the axis of rotation, passes through in sequence: a first ball; the cylindrical plastic cage; the first flange of a support tab; and the cylindrical plastic cage.

According to aspects illustrated herein, there is provided a cage and ball sub-assembly, including:
an axis of rotation; a cylindrical plastic cage including a radially outermost surface, a radially innermost surface, a first plurality of indentations extending radially inwardly from the radially outermost surface into the cylindrical plastic cage, a second plurality of indentations extending radially outwardly from the radially innermost surface into the cylindrical plastic cage, and a plurality of pockets, each pocket circumferentially disposed between a respective pair of indentations included in the first plurality of indentations; a metal insert including a plurality of support tabs, each support tab embedded in the cylindrical plastic cage and including a circumferentially disposed portion, a first flange extending from the circumferentially disposed portion in a first radial direction, and a second flange extending from the circumferentially disposed portion in the first radial direction; and a plurality of balls disposed within the plurality of pockets. A circular arc, centered on the axis of rotation and orthogonal to the axis of rotation passes through in sequence: a first ball; the cylindrical plastic cage; the first flange of a support tab included in the plurality of support tabs; the second flange of the support tab; the cylindrical plastic cage; and a second ball. The circular arc is disposed: radially inward of the circumferentially disposed portion of said each support tab; or radially outward of the circumferentially disposed portion of said each support tab.

According to aspects illustrated herein, there is provided a cage and ball sub-assembly, an axis of rotation; a cylindrical plastic cage including a radially outermost surface a plurality of indentations extending radially inwardly from the radially outermost surface into the cylindrical plastic cage, and a plurality of pockets, each pocket circumferentially disposed between a respective pair of indentations included in the plurality of indentations; a metal insert including an annular portion at least partially embedded in the cylindrical plastic ring, and a plurality of support tabs; and a plurality of balls disposed within the plurality of pockets. Each support tab: extends from the annular portion in an axial direction; is embedded in the cylindrical plastic cage; and includes: a circumferentially disposed portion; a first flange extending radially outwardly and in a first circumferential direction from the circumferentially disposed portion; and a second flange extending radially outwardly and in a second circumferential direction, opposite the first circumferential direction, from the circumferentially disposed portion. A circular arc, centered on the axis of rotation and orthogonal to the axis of rotation, passes through in sequence: a first ball; the cylindrical plastic cage; the first flange of a support tab included in the plurality of support tabs; the second flange of the support tab; the cylindrical plastic cage; and a second ball.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
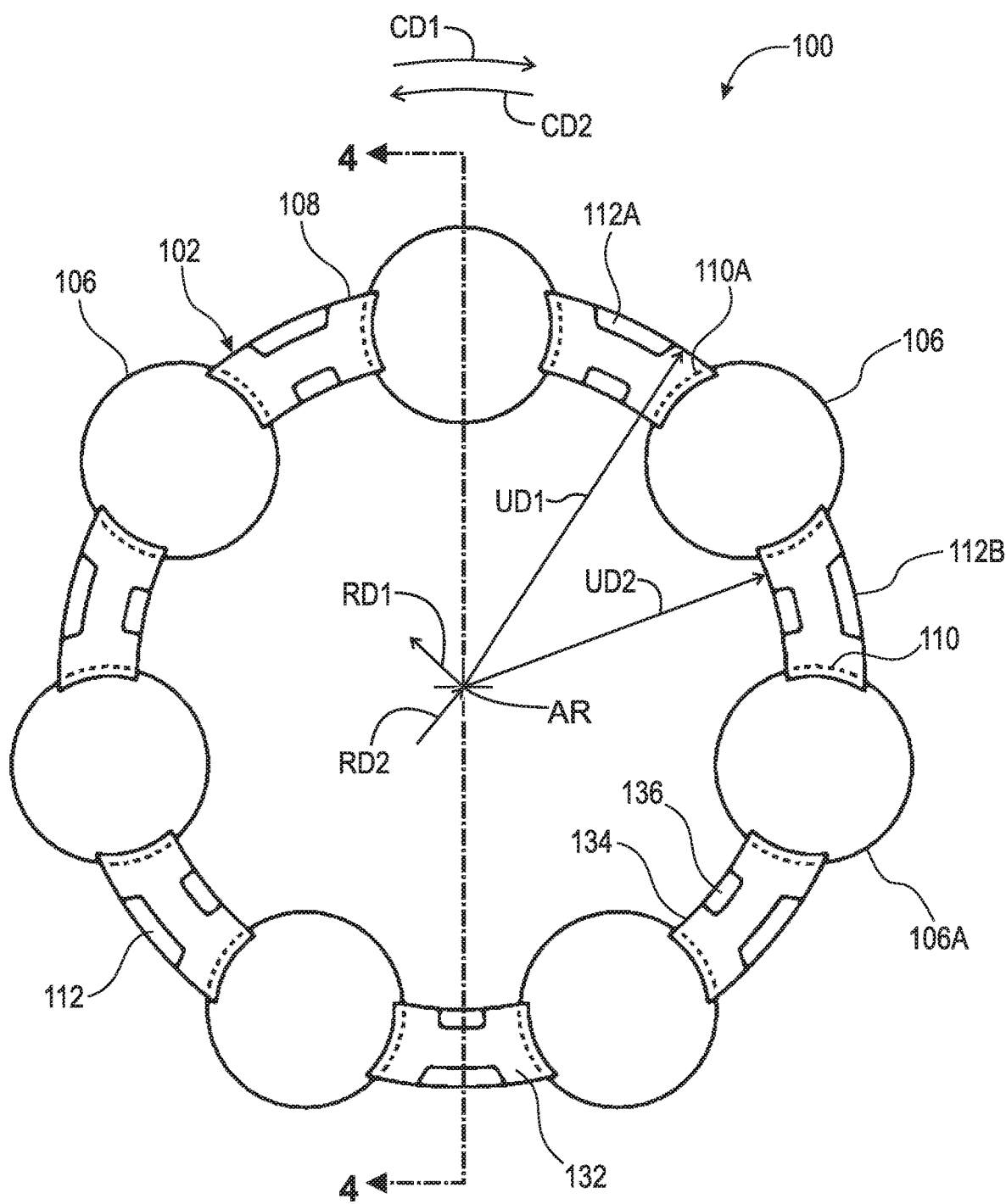
FIG. 1 is a front view of a cage and ball sub-assembly with a plastic cage and a metal insert.

FIG. 1 is a front view of cage and ball sub-assembly 100 with a plastic cage and a metal insert.

Figure 2:
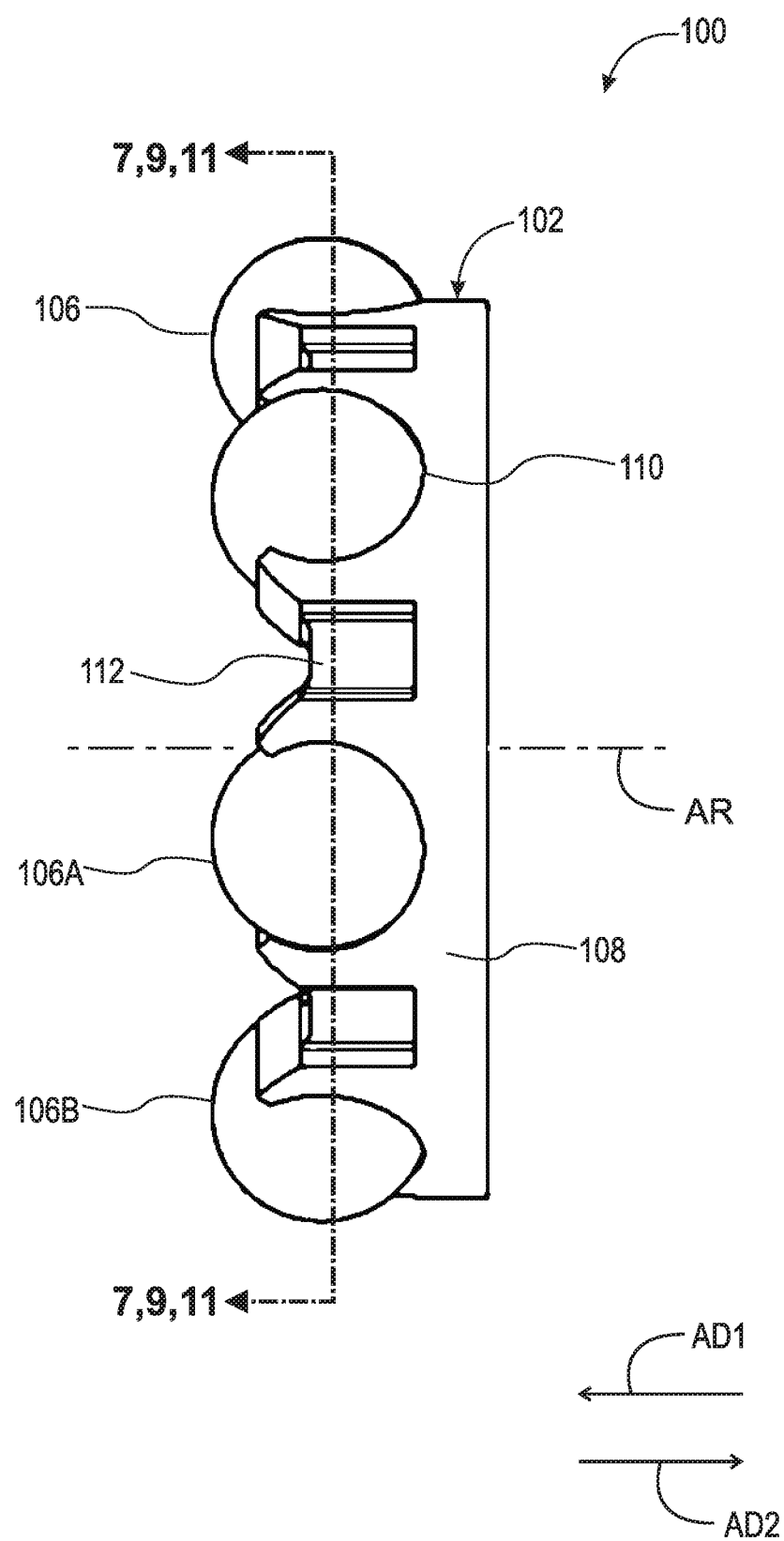
FIG. 2 is a side view of the cage and ball sub-assembly shown in FIG. 1.

FIG. 2 is a side view of cage and ball sub-assembly 100 shown in FIG. 1.

Figure 3:
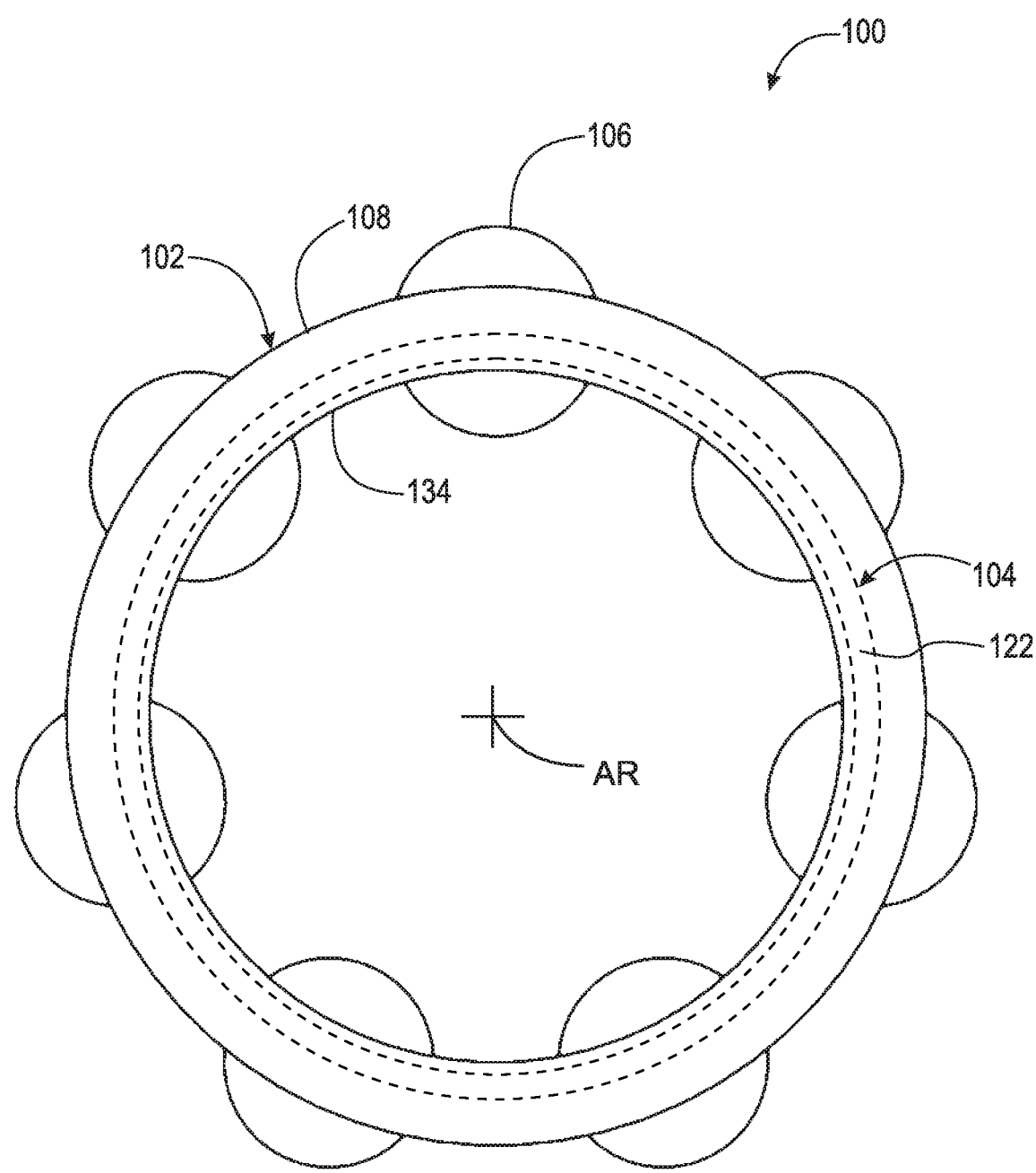
FIG. 3 is a back view of the cage and ball sub-assembly shown in FIG. 1.

FIG. 3 is a back view of cage and ball sub-assembly 100 shown in FIG. 1.

Figure 4:
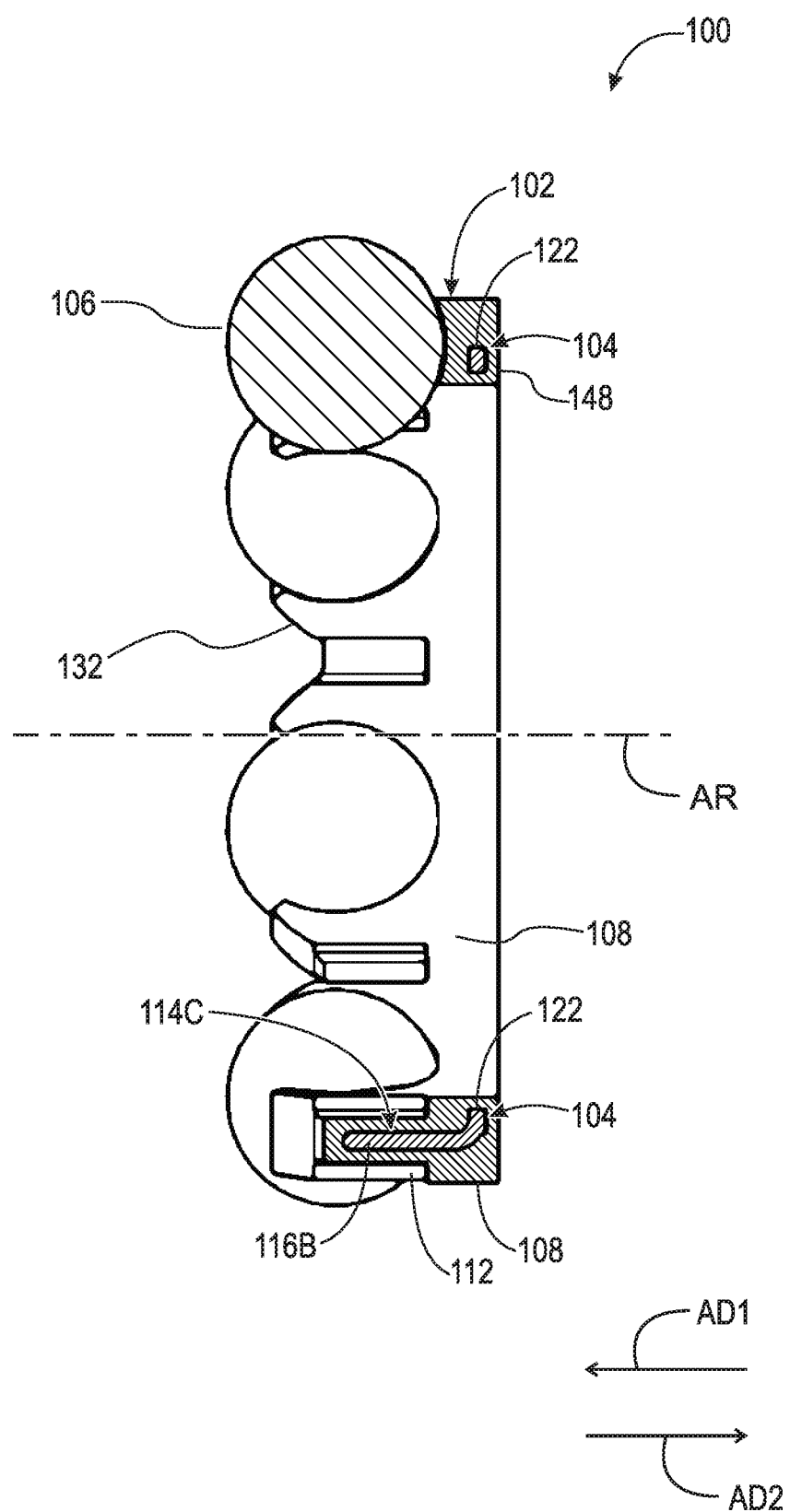
FIG. 4 is a cross-sectional view generally along line 4-4 in FIG. 1.

FIG. 4 is a cross-sectional view generally along line 4-4 in FIG. 1. The following should be viewed in light of FIGS. 1 through 4. Cage and ball sub-assembly 100 includes: axis of rotation AR; cylindrical plastic cage 102; metal insert 104; and balls 106. Cage 102 includes: circumferentially disposed cage surface 108; pockets 110; and indentations, or cutouts, 112. Circumferentially disposed cage surface 108 is a radially outermost surface of cage 102 and is at uniform distance UD1, in radial outward direction RD1 orthogonal to axis of rotation AR, from axis of rotation AR.

Each pocket 110 is circumferentially disposed between a respective pair of indentations 112. For example, pocket 110A is circumferentially disposed between indentation 112A and indentation 112B in circumferential direction CD1. Each indentation 112 extends from surface 108 into cage 102 in direction RD2, opposite direction RD1. Each Ball 106 is disposed within a respective pocket 110 as in known in the art. In general, a reference character "[number][number][number][letter]" designates a specific example of an element labeled as "[number] [number] [number]." For example, pocket 110A is a specific example from among pockets 110.

Figure 5:
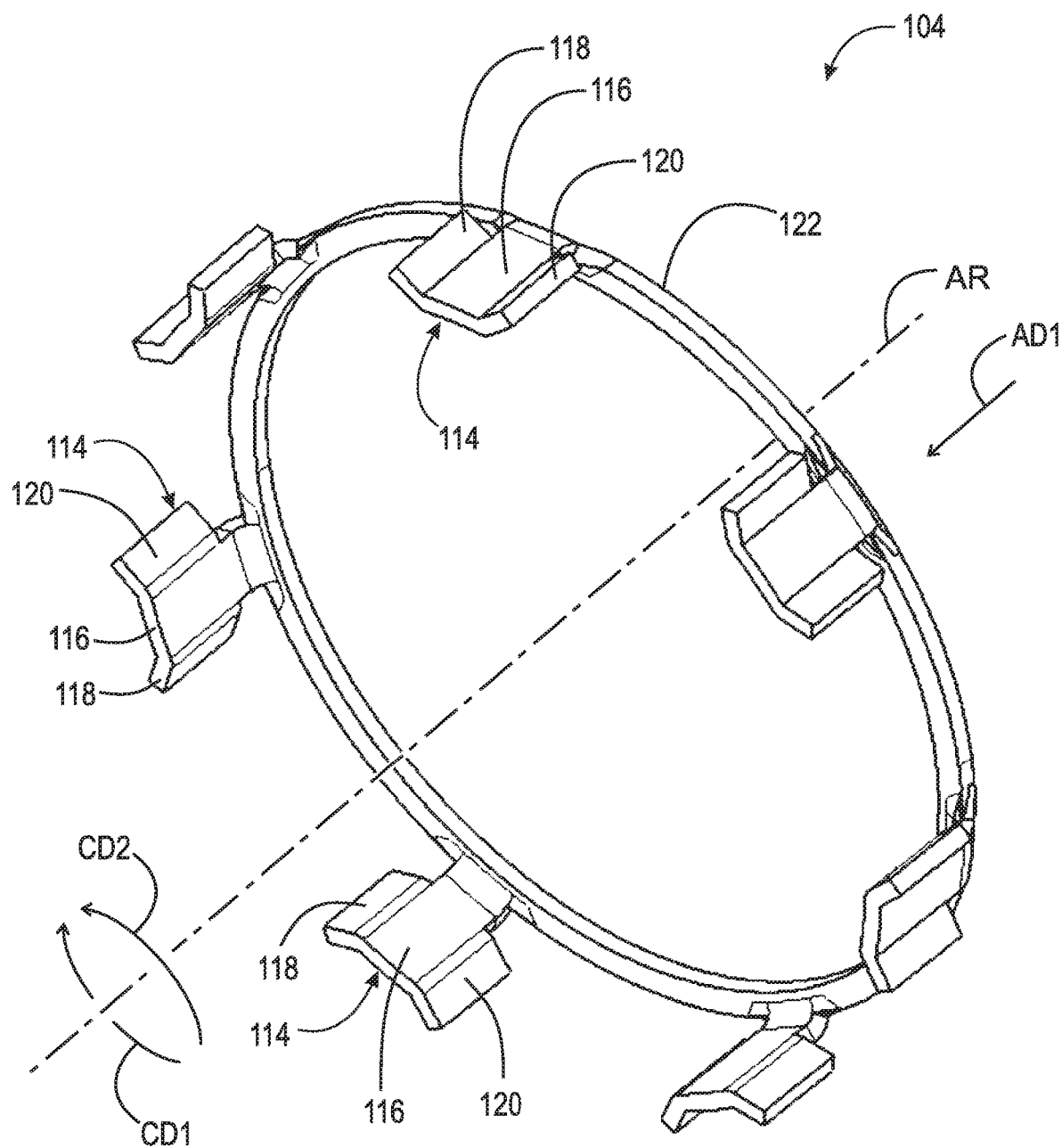
FIG. 5 is an isometric view of a metal insert.

FIG. 5 is an isometric view of a metal insert.

Figure 6:
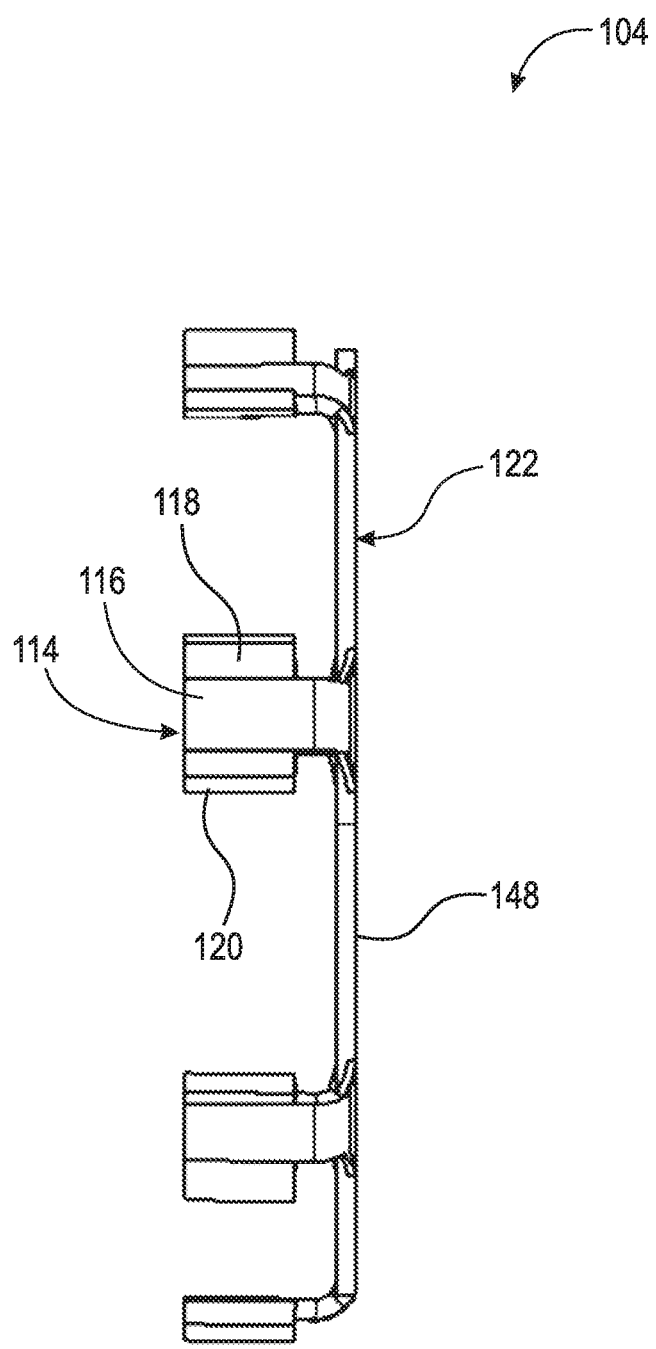
FIG. 6 is a side view of the metal insert in shown in FIG. 5.

FIG. 6 is a side view of the metal insert shown in FIG. 5.

Figure 7:
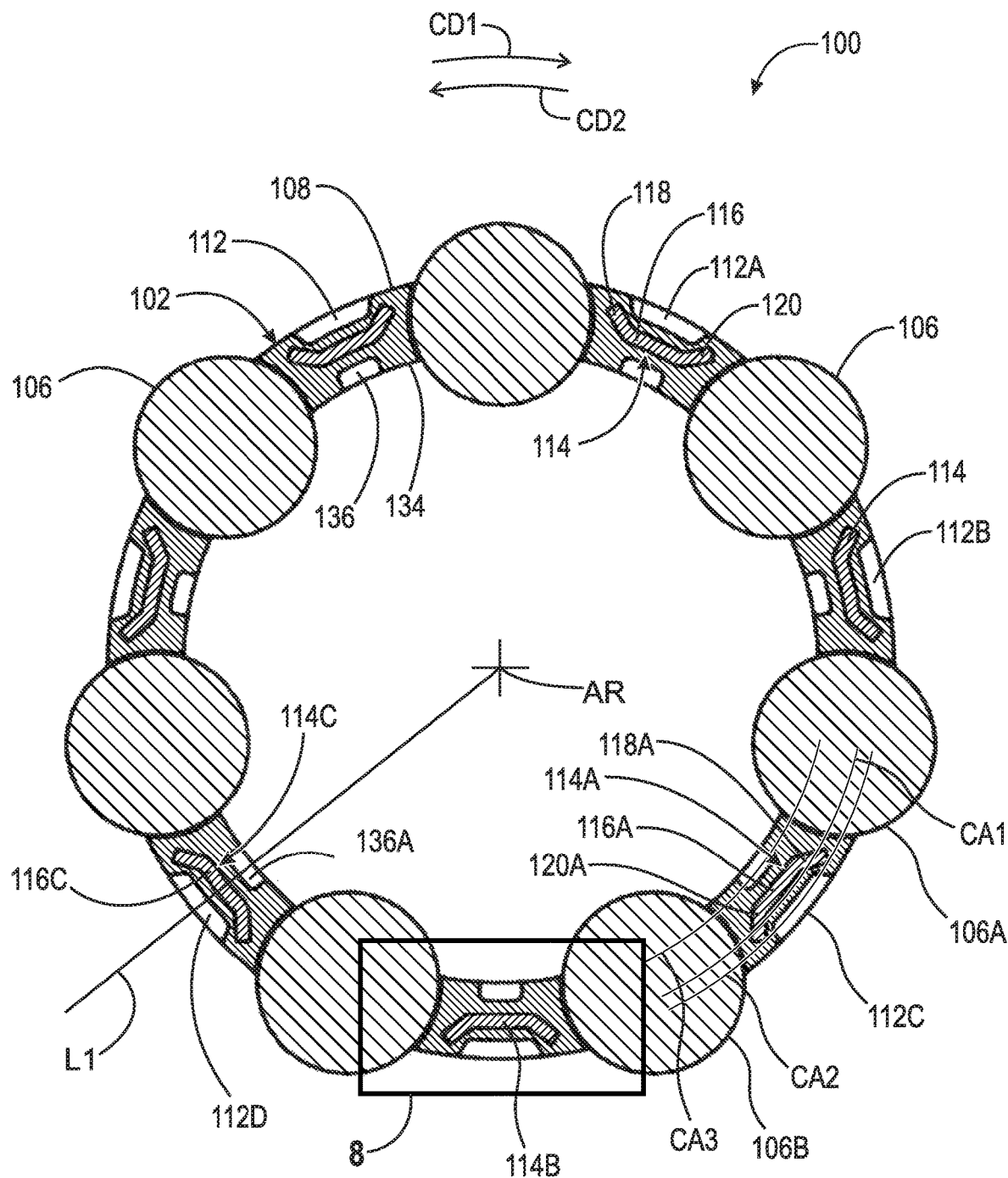
FIG. 7 is a cross-sectional view generally along line 7,9,11-7,9,11 in FIG. 2.

FIG. 7 is a cross-sectional view generally along line 7,9,11-7,9,11 in FIG. 2. The following should be viewed in light of FIGS. 1 through 7. Metal insert 104 includes support tabs 114. Each support tab 114: is embedded in cage 102; and includes circumferentially disposed portion 116. In the example of FIGS. 5 through 7: each support tab 114 includes flange 118, and flange 120; flange 118 extends from circumferentially disposed portion 116 in radial direction RD1 and in circumferential direction CD2, opposite direction CD1; and flange 120 extends from circumferentially disposed portion 116 in radial direction RD1 and in circumferential direction CD1. In an example embodiment: metal insert 104 includes annular portion 122 at least partially embedded in cylindrical plastic cage 102; and support tabs 114 extend from annular portion 122 in axial direction AD1, parallel to axis AR. In the example of FIG. 3, portion 122 is fully embedded in cage 102. In the example of FIGS. 5 through 7, portion 122 is continuous in circumferential direction CD1. In an example embodiment, tabs 114 are integral to annular portion 122.

Circular arc CA1, centered on axis of rotation AR and orthogonal to axis of rotation AR passes through in sequence: ball 106A; plastic cage 102; flange 118A for tab 114A; flange 120A for tab 114A; plastic cage 102; and ball 106B. In an example embodiment, circular arc CA2, centered on axis of rotation AR and orthogonal to axis of rotation AR passes through in sequence: ball 106A; plastic cage 102; flange 118A for tab 114A; indentation 112C; flange 120A for tab 114A; plastic cage 102; and ball 106B. Arc CA1 does not pass through indentation 112C. Circular arc CA3 passes through cage 102 without passing through tab 114A. Arc CA1 and arc CA2 are disposed radially outward of portion 116A of tab 114A. By "circular arc" "centered on axis of rotation AR and orthogonal to axis of rotation AR," we mean that the circular arc is a segment of a circle centered on axis of rotation AR and orthogonal to axis of rotation AR. For example, the circular arc is at a uniform distance, in radial direction RD1 and from axis AR, equal to the radius of a circle including the circular arc.

Figure 8:
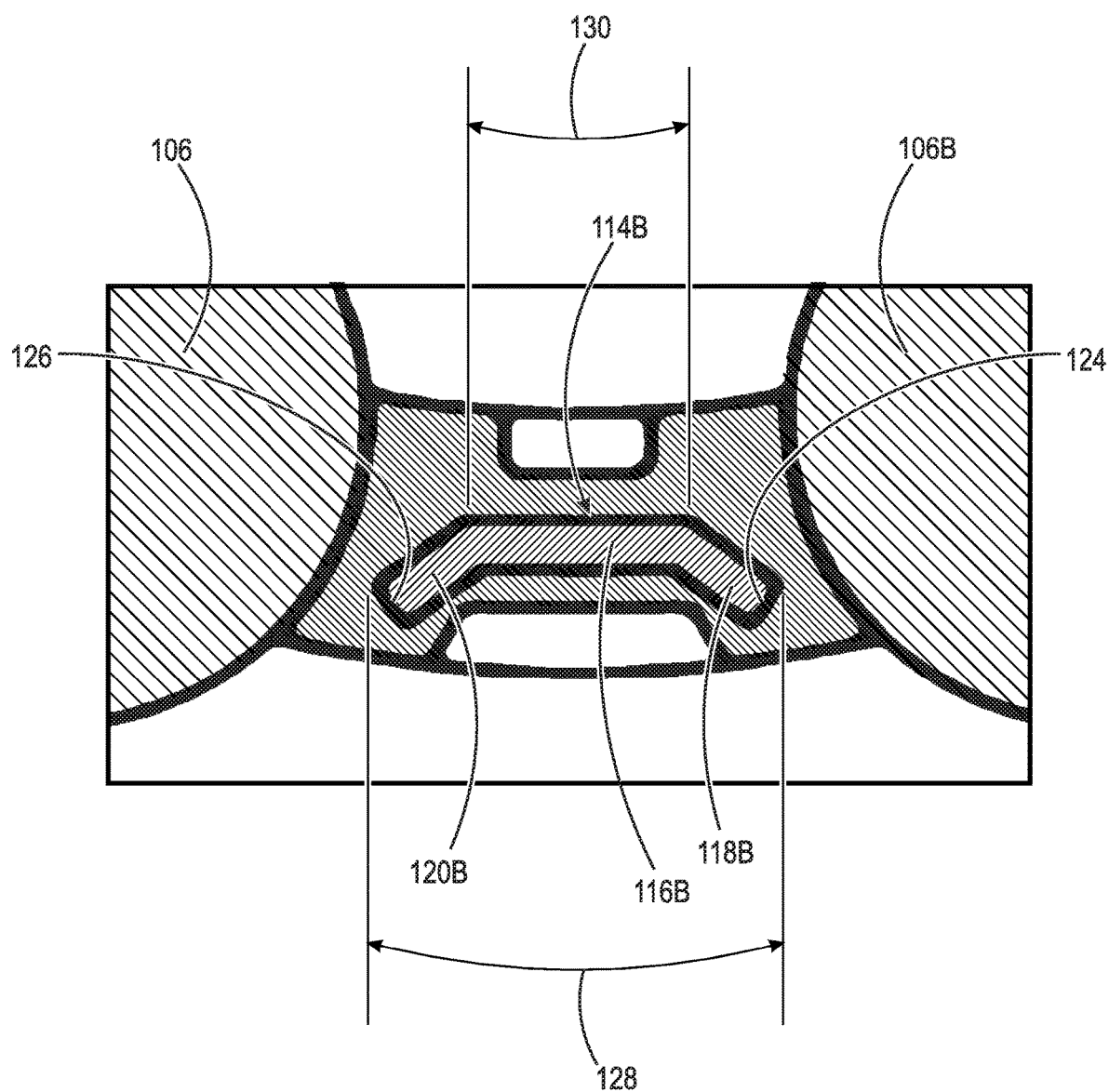
FIG. 8 is a detail of area 8 in FIG. 7.

FIG. 8 is a detail of area 8 in FIG. 7. The following should be viewed in light of FIGS. 1 through 8. For at least one tab 114, flange 118 includes a distal end and flange 120 includes a distal end. For example for tab 114B: flange 118B includes distal end 124; and flange 120B includes distal end 126. Distance 128 is a maximum distance between end 124 and end 126 in direction CD1. Distance 130 is a maximum extent of portion 116B for tab 114B in direction CD1. In an example embodiment, distance 128 is greater than distance 130.

Cage 102 includes axial surface 132 facing at least partially in axial direction AD1. Indentations 112 extend from surface 132 in axial direction AD2, opposite axial direction AD1. Cage 102 includes: circumferentially disposed cage surface 134. Circumferentially disposed cage surface 134 is a radially innermost surface of cage 102 and is at uniform distance UD2, in radial outward direction RD1, from axis of rotation AR. In an example embodiment cage 102 includes indentations, or cutouts, 136. Each indentation 136 extends from surface 132 into cage 102 in direction RD1. A line, orthogonal to axis AR passes through: an indentation 112; portion 116 of a tab 114; and an indentation 136. For example, line L1 passes through indentation 112D, portion 116C of tab 114C, and indentation 136A.

Figure 9:
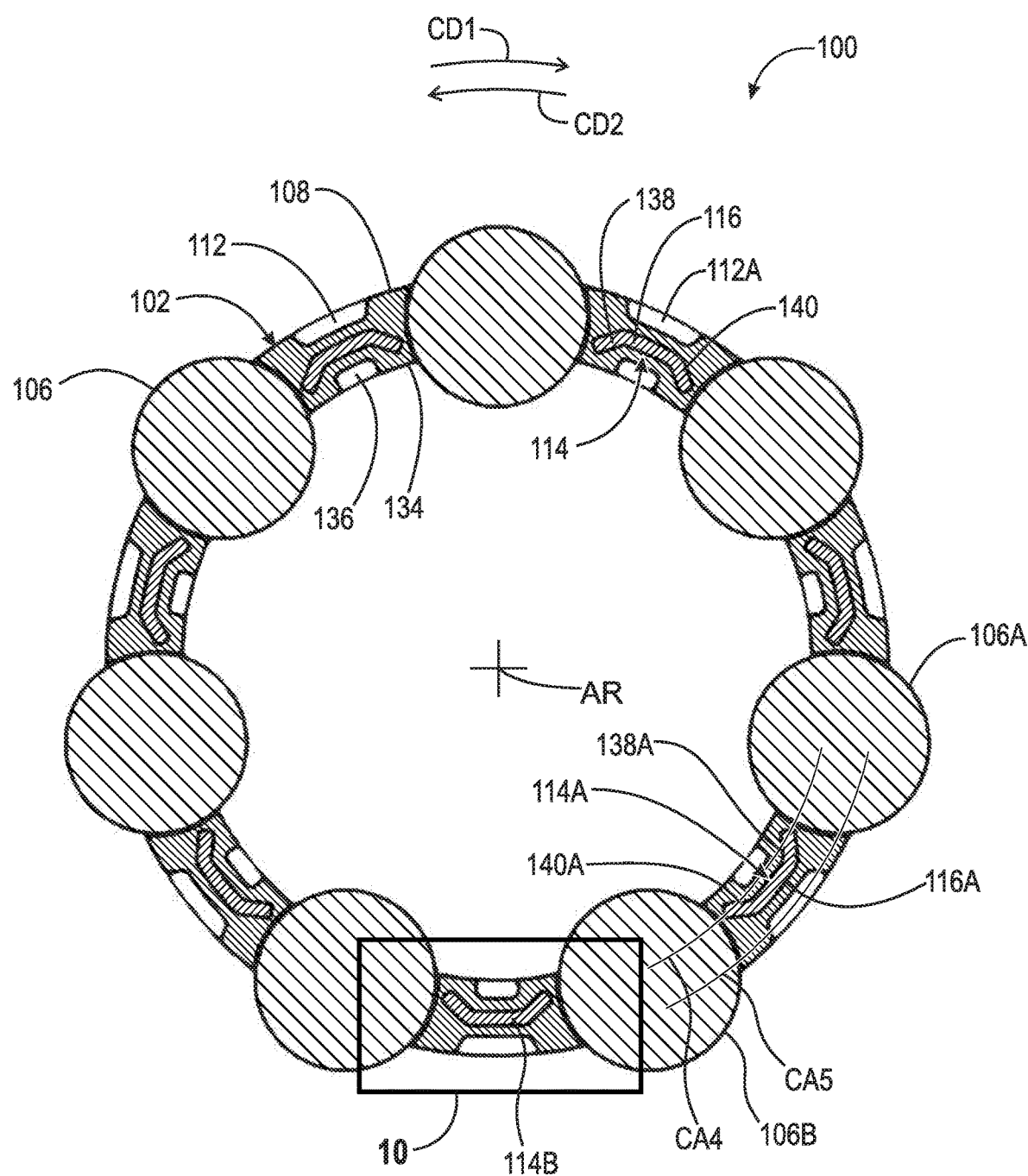
FIG. 9 is a cross-sectional view generally along line 7,9,11-7,9,11 in FIG. 2.

FIG. 9 is a cross-sectional view generally along line 7,9,11-7,9,11 in FIG. 2. The following should be viewed in light of FIGS. 1 through 4 and 9. The discussion for FIGS. 1 through 4 is applicable to FIG. 9 except as noted. In the example of FIG. 9: each support tab 114 includes flange 138, and flange 140; flange 138 extends from circumferentially disposed portion 116 in radial direction RD2 and in circumferential direction CD2; and flange 140 extends from circumferentially disposed portion 116 in radial direction RD2 and in circumferential direction CD1. Flanges 138 and 140 replace flanges 118 and 120, respectively, shown in FIGS. 5 through 7.

Circular arc CA4, centered on axis of rotation AR and orthogonal to axis of rotation AR passes through in sequence: ball 106A; plastic cage 102; flange 138A for tab 114A; plastic cage 102; flange 140A for tab 114A; plastic cage 102; and ball 106B. Circular arc CA5, centered on axis of rotation AR and orthogonal to axis of rotation AR passes through plastic cage 102 without passing through tab 114A.

Figure 10:
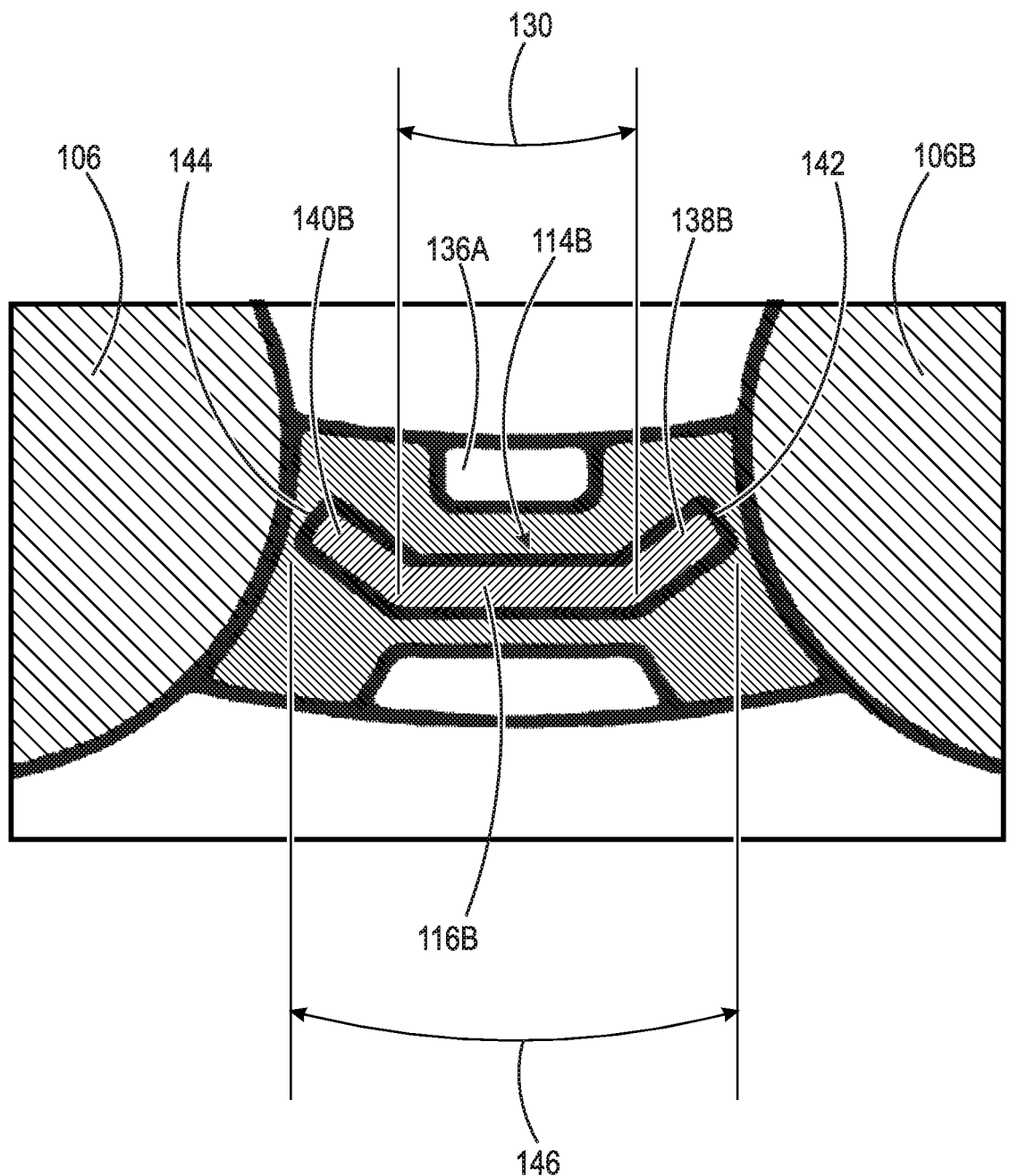
FIG. 10 is a detail of area 10 in FIG. 9.

FIG. 10 is a detail of area 10 in FIG. 9. The following should be viewed in light of FIGS. 1 through 4, 9, and 10. For at least one tab 114: flange 138 includes a distal end; and flange 140 includes a distal end. For example, for tab 114B: flange 138B includes distal end 142; and flange 140B includes distal end 144. Distance 146 is a maximum distance between end 142 and end 144 in direction CD1. Portion 116B for tab 114B extends distance 130 in direction CD1. In an example embodiment, distance 146 is greater than distance 130.

Figure 11:
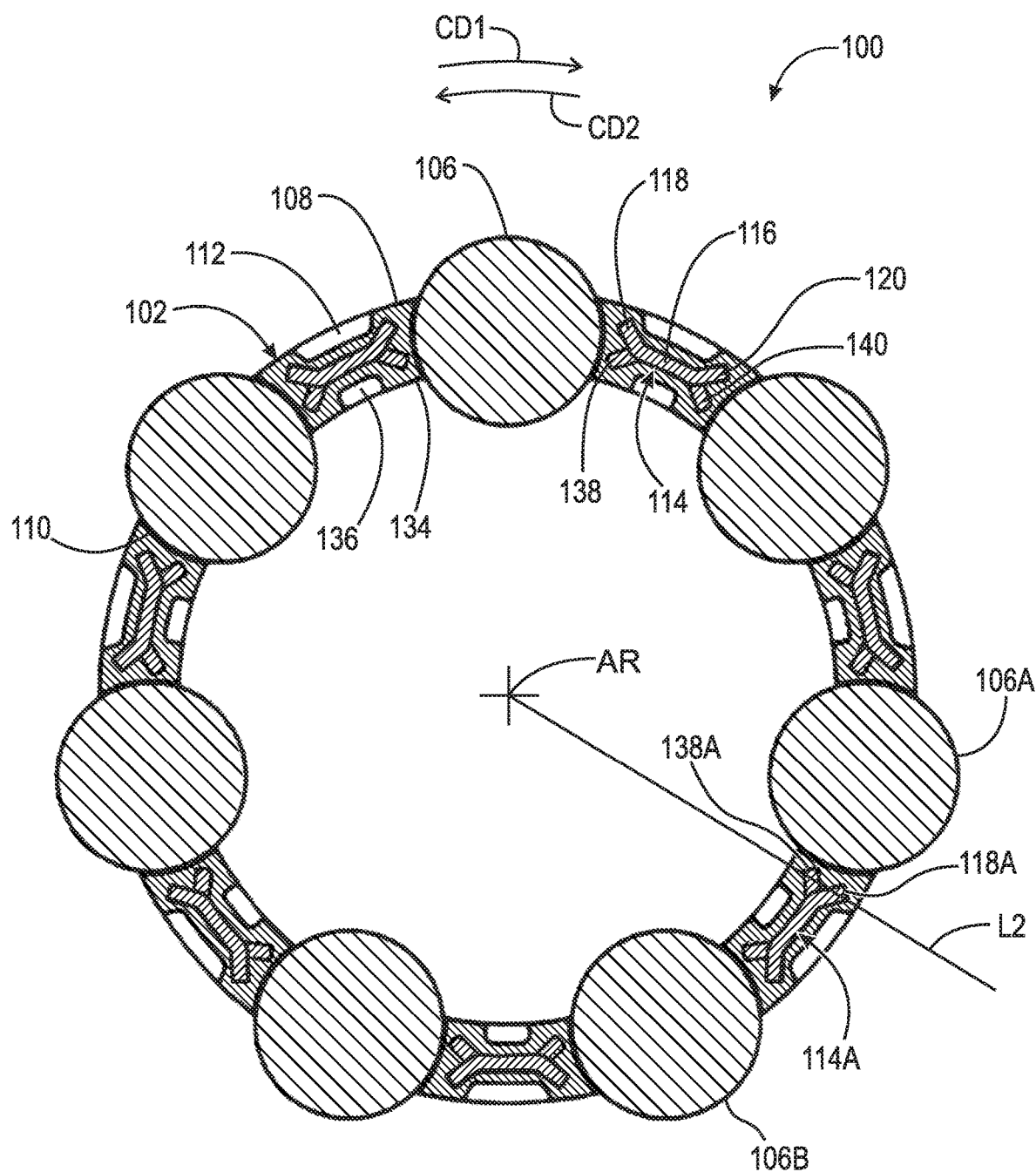
FIG. 11 is a cross-sectional view generally along line 7,9,11-7,9,11 in FIG. 2.

FIG. 11 is a cross-sectional view generally along line 7,9,11-7,9,11 in FIG. 2. The following should be viewed in light of FIGS. 1 through 11. The discussion for FIGS. 1 through 10 is applicable to FIG. 11 except as noted. In the example of FIG. 11: each support tab 114 includes: portion 116; and flanges 118, 120, 138, and 140. A line, orthogonal to axis of rotation AR passes through a flange 138, cage 102, and a flange 118. For example, line L2, orthogonal to axis AR passes through cage 102, flange 118A of tab 114A, and flange 138A of tab 114A.

Figure 12:
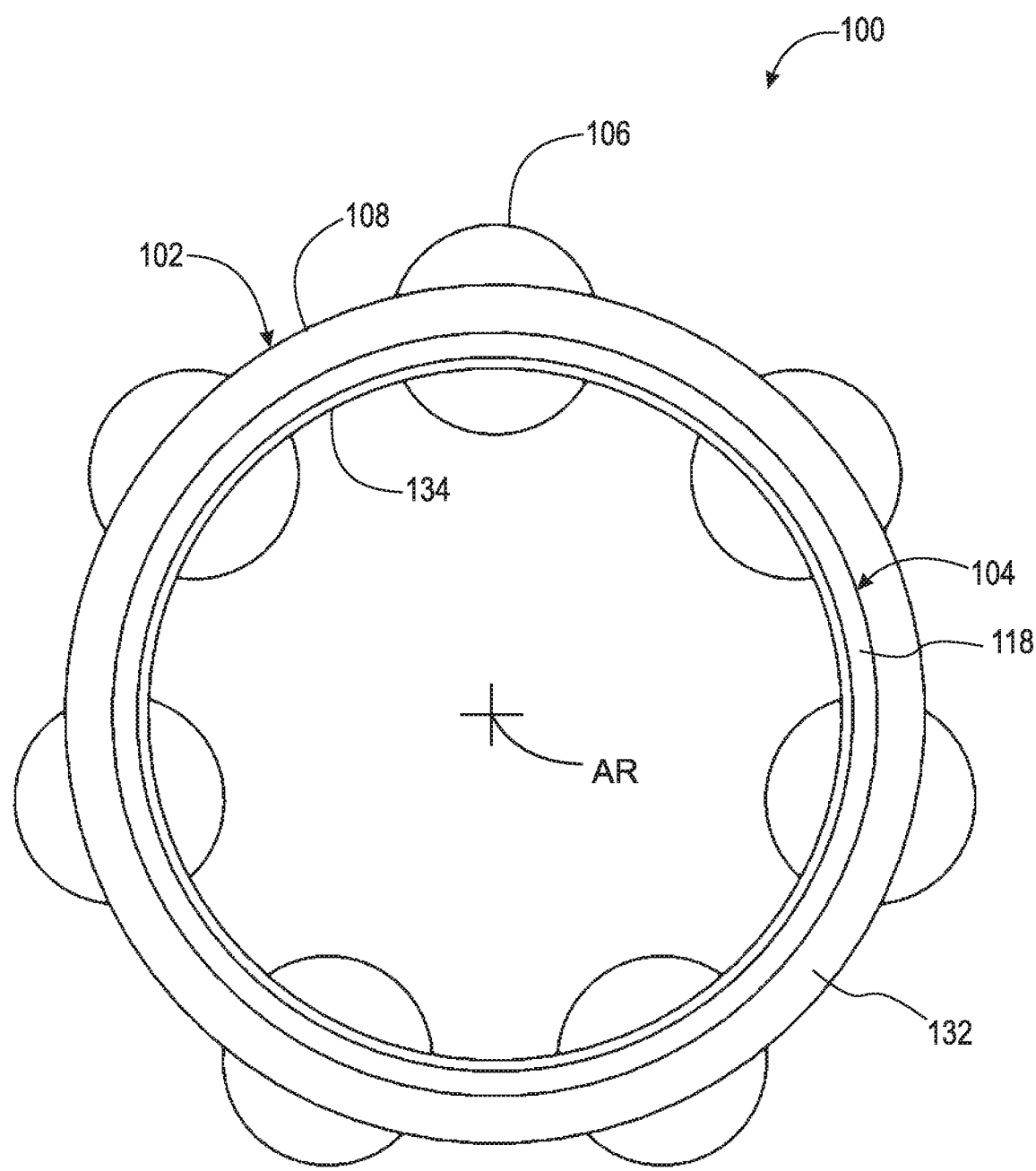
FIG. 12 is a back view of the cage and ball sub-assembly shown in FIG. 1.

FIG. 12 is a back view of the cage and ball sub-assembly shown in FIG. 1. In the example of FIG. 12, axial surface 148 of insert 104 is exposed, that is, axial surface 148 is not embedded in cage 102.

Metal insert 104, in particular tabs 114, prevent excessive expansion of cage 102 during high speed operation of a ball bearing including assembly 100. For example: flanges 118 and 120 limit circumferential and radial expansion of cage 102 at indentations 112; and flanges 138 and 140 limit circumferential and radial expansion of cage 102 at indentations 136.

Figure 13:
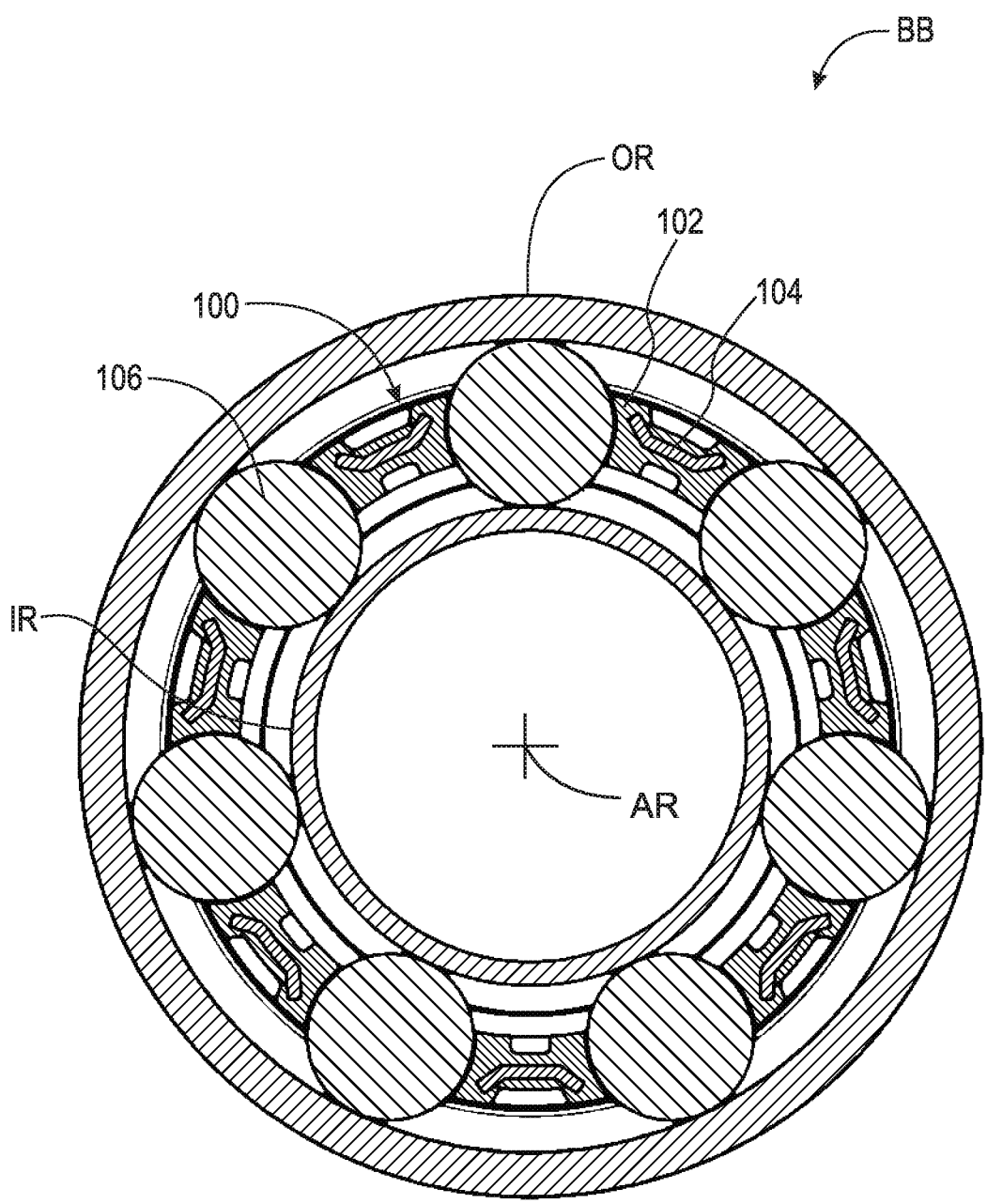
FIG. 13 is a cross-sectional view of a ball bearing including the cage and ball sub-assembly shown in FIG. 1.

FIG. 13 is a cross-sectional view of ball bearing BB including cage and ball sub-assembly 100 shown in FIG. 1. FIG. 13 illustrates use of sub-assembly 100 in typical ball bearing BB. As is known in the art, sub-assembly 100 is radially disposed between outer ring OR and inner ring IR and balls 106 contact ring OR and ring IR. It should be understood that sub-assembly 100 is not limited to use in the ball bearing configuration shown in FIG. 13 and that sub-assembly 100 is usable in other configurations of known ball bearings.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AR axis of rotation
AD1 axial direction
AD2 axial direction
BB ball bearing
CA1 circular arc
CA2 circular arc
CA3 circular arc
CA4 circular arc
CA5 circular arc
CD1 circumferential direction
CD2 circumferential direction
IR inner ring
L1 line
L2 line
OR outer ring
RD1 radial direction
RD2 radial direction
UD1 uniform distance
UD2 uniform distance
100 cage and ball sub-assembly
102 cylindrical plastic cage
104 metal insert
106 ball
106A ball
106B ball
108 circumferentially disposed cage surface
110 pocket, cage
110A pocket, cage
112 indentation/cutout, cage
112A indentation/cutout, cage
112B indentation/cutout, cage
112C indentation/cutout, cage
112D indentation/cutout, cage
114 support tab, metal insert
114A support tab, metal insert
114B support tab, metal insert
114C support tab, metal insert
116 circumferentially disposed portion, support tab
116A circumferentially disposed portion, support tab
116B circumferentially disposed portion, support tab
116C circumferentially disposed portion, support tab
118 flange, support tab
118A flange, support tab
118B flange, support tab
120 flange, support tab
120A flange, support tab
120B flange, support tab
122 annular portion, metal insert
124 distal end, flange 118
126 distal end, flange 120
128 distance, distal ends
130 distance, circumferentially disposed portion
132 axial surface, cage
134 circumferentially disposed cage surface
136 indentation/cutout, cage
136A indentation/cutout, cage
138 flange, support tab
138A flange, support tab
138B flange, support tab
140 flange, support tab
140A flange, support tab
140B flange, support tab
142 distal end, flange 138
144 distal end, flange 140
146 distance, distal ends
148 axial surface, metal insert

The invention claimed is:

1. A cage and ball sub-assembly, comprising:
a cylindrical plastic cage including a first circumferentially disposed cage surface, a first plurality of indentations extending from the first circumferentially disposed cage surface into the cylindrical plastic cage in a first radial direction, and a plurality of pockets, each pocket circumferentially disposed between a respective pair of indentations included in the first plurality of indentations;
a metal insert including a plurality of support tabs, each support tab embedded in the cylindrical plastic cage and including a circumferentially disposed portion and a first flange extending from the circumferentially disposed portion in a second radial direction, opposite the first radial direction; and,
a plurality of balls disposed within the plurality of pockets, wherein a first circular arc centered on an axis of rotation and orthogonal to the axis of rotation passes through in sequence a first ball, the cylindrical plastic cage, the first flange of a support tab included in the plurality of support tabs, and the cylindrical plastic cage.

2. The cage and ball sub-assembly of claim 1, wherein the first circular arc passes through in sequence the first ball, the cylindrical plastic cage, the first flange of the support tab, the cylindrical plastic cage, and an indentation included in the first plurality of indentations.

3. The cage and ball sub-assembly of claim 1, wherein said each support tab includes a second flange extending from the circumferentially disposed portion in the second radial direction, and the first circular arc passes through in sequence the first ball, the cylindrical plastic cage, the first flange, the second flange, the cylindrical plastic cage, and a second ball.

4. The cage and ball sub-assembly of claim 1, wherein the first circumferentially disposed cage surface is at a uniform distance, in the first radial direction, from the axis of rotation.

5. The cage and ball sub-assembly of claim 1, wherein the metal insert includes an annular portion at least partially embedded in the cylindrical plastic cage, and the plurality of support tabs extends from the annular portion in a first axial direction.

6. The cage and ball sub-assembly of claim 5, wherein the annular portion is continuous in a circumferential direction.

7. The cage and ball sub-assembly of claim 5, wherein a surface of the annular portion is not embedded in the cylindrical plastic cage.

8. The cage and ball sub-assembly of claim 1, wherein the cylindrical plastic cage includes an axial surface facing in a first axial direction, and the first plurality of indentations extends from the axial surface into the cylindrical plastic cage in a second axial direction, opposite the first axial direction.

9. The cage and ball sub-assembly of claim 1, wherein a second circular arc, centered on the axis of rotation and orthogonal to the axis of rotation, passes through the cylindrical plastic cage without passing through the plurality of support tabs.

10. The cage and ball sub-assembly of claim 1, wherein the first flange extends from the circumferentially disposed portion in a first circumferential direction.

11. The cage and ball sub-assembly of claim 1, wherein said each support tab includes a second flange extending from the circumferentially disposed portion of said each support tab in the second radial direction and in a first circumferential direction, and the first flange of said each support tab extends from the circumferentially disposed portion in a second circumferential direction, opposite first circumferential direction.

12. The cage and ball sub-assembly of claim 1, wherein the first circumferentially disposed cage surface is a radially outermost surface of the cylindrical plastic cage and the first radial direction is radially inward toward the axis of rotation, or the first circumferentially disposed cage surface is a radially innermost surface of the cylindrical plastic cage and the first radial direction is radially outward away from the axis of rotation.

13. The cage and ball sub-assembly of claim 1, wherein the cylindrical plastic cage includes a second circumferentially disposed cage surface and a second plurality of indentations extending from the second circumferentially disposed cage surface into the cylindrical plastic cage in the second radial direction, and a line orthogonal to the axis of rotation passes through an indentation included in the first plurality of indentations, the circumferentially disposed portion of a support tab included in the plurality of support tabs and an indentation included in the second plurality of indentations.

14. The cage and ball sub-assembly of claim 1, wherein a support tab included in the plurality of support tabs includes a second flange extending from the circumferentially disposed portion of the support tab in the first radial direction, and a line orthogonal to the axis of rotation passes through the cylindrical plastic cage, the first flange of the support tab and the second flange of the support tab.

15. The cage and ball sub-assembly of claim 1, wherein a support tab included in the plurality of support tabs includes a second flange extending from the circumferentially disposed portion of the support tab in the second radial direction, the first flange of the support tab includes a first distal end, the second flange of the support tab includes a second distal end, a first distance is a maximum distance between the first distal end and the second distal end in a circumferential direction, a second distance is a maximum extent in the circumferential direction of the circumferentially disposed portion of the support tab, and the first distance is greater than the second distance.

16. A cage and ball sub-assembly, comprising:
a cylindrical plastic cage including a radially outermost surface, a radially innermost surface, a first plurality of indentations extending radially inwardly from the radially outermost surface into the cylindrical plastic cage, a second plurality of indentations extending radially outwardly from the radially innermost surface into the cylindrical plastic cage, and a plurality of pockets, each pocket circumferentially disposed between a respective pair of indentations included in the first plurality of indentations;
a metal insert including a plurality of support tabs, each support tab embedded in the cylindrical plastic cage and including a circumferentially disposed portion, a first flange extending from the circumferentially disposed portion in a first radial direction, and a second flange extending from the circumferentially disposed portion in the first radial direction; and,
a plurality of balls disposed within the plurality of pockets, wherein a circular arc centered on an axis of rotation and orthogonal to the axis of rotation passes through in sequence a first ball, the cylindrical plastic cage, the first flange of a support tab included in the plurality of support tabs, the second flange of the support tab, the cylindrical plastic cage and a second ball, and the circular arc is disposed radially inward of the circumferentially disposed portion of said each support tab or radially outward of the circumferentially disposed portion of said each support tab.

17. The cage and ball sub-assembly of claim 16, wherein the metal insert includes an annular portion at least partially embedded in the cylindrical plastic cage, and said each support tab is integral to the annular portion and extends from the annular portion in an axial direction.

18. The cage and ball sub-assembly of claim 16, wherein the first flange extends from the circumferentially disposed portion in a first circumferential direction, and the second flange extends from the circumferentially disposed portion in a second circumferential direction, opposite the first circumferential direction.

19. The cage and ball sub-assembly of claim 16, wherein said each support tab includes a third flange extending from the circumferentially disposed portion in a second radial direction opposite the first radial direction and in a first circumferential direction, and a fourth flange extending from the circumferentially disposed portion in the second radial direction and in a second circumferential direction, opposite the first circumferential direction.

20. A cage and ball sub-assembly, comprising:
a cylindrical plastic cage including a radially outermost surface, a plurality of indentations extending radially inwardly from the radially outermost surface into the cylindrical plastic cage, and a plurality of pockets, each pocket circumferentially disposed between a respective pair of indentations included in the plurality of indentations;

a metal insert including an annular portion at least partially embedded in the cylindrical plastic ring and a plurality of support tabs, each support tab extending from the annular portion in an axial direction, embedded in the cylindrical plastic cage and including a circumferentially disposed portion, a first flange extending radially outwardly and in a first circumferential direction from the circumferentially disposed portion and a second flange extending radially outwardly and in a second circumferential direction opposite the first circumferential direction from the circumferentially disposed portion, and a plurality of balls disposed within the plurality of pockets, wherein a circular arc centered on an axis of rotation and orthogonal to the axis of rotation passes through in sequence a first ball, the cylindrical plastic cage, the first flange of a support tab included in the plurality of support tabs, the second flange of the support tab, the cylindrical plastic cage, and a second ball.

\* \* \* \* \*